United States Patent
Lee et al.

(10) Patent No.: US 10,055,055 B2
(45) Date of Patent: Aug. 21, 2018

(54) METHOD AND DEVICE FOR CONTROLLING OPERATION ACCORDING TO DAMAGE TO TOUCH AREA OF ELECTRONIC DEVICE

(71) Applicant: Samsung Electronics Co., Ltd., Suwon-si, Gyeonggi-do (KR)

(72) Inventors: Junho Lee, Seoul (KR); Myunggeun Koh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 14/694,615

(22) Filed: Apr. 23, 2015

(65) Prior Publication Data

US 2015/0309660 A1 Oct. 29, 2015

(30) Foreign Application Priority Data

Apr. 23, 2014 (KR) .................. 10-2014-0048911

(51) Int. Cl.
*G06F 3/045* (2006.01)
*G06F 3/041* (2006.01)
*G06F 3/0488* (2013.01)

(52) U.S. Cl.
CPC .......... *G06F 3/0418* (2013.01); *G06F 3/0488* (2013.01); *G06F 2203/04104* (2013.01)

(58) Field of Classification Search
CPC ...... G06F 3/0488; G06F 3/0418; G06F 3/044; G06F 3/0412
See application file for complete search history.

(56) References Cited

U.S. PATENT DOCUMENTS

| 2006/0227114 A1 | 10/2006 | Geaghan et al. |
| 2011/0291974 A1 | 12/2011 | Son et al. |
| 2013/0100037 A1* | 4/2013 | Mabie .................. G06F 3/0418 345/173 |
| 2014/0253494 A1* | 9/2014 | Jiang .................... G06F 3/0418 345/174 |

FOREIGN PATENT DOCUMENTS

| KR | 10-2011-0131909 A | 12/2011 |
| KR | 10-2012-00026397 A | 3/2012 |

* cited by examiner

*Primary Examiner* — Towfiq Elahi
(74) *Attorney, Agent, or Firm* — Jefferson IP Law, LLP

(57) ABSTRACT

A method of controlling an operation of an electronic device having a damaged touch area is included. The method includes detecting a damaged area in a touch area, identifying information on a location and a width of the damaged area, and performing a touch compensation function when a touch is to be compensated for based on the information.

18 Claims, 10 Drawing Sheets

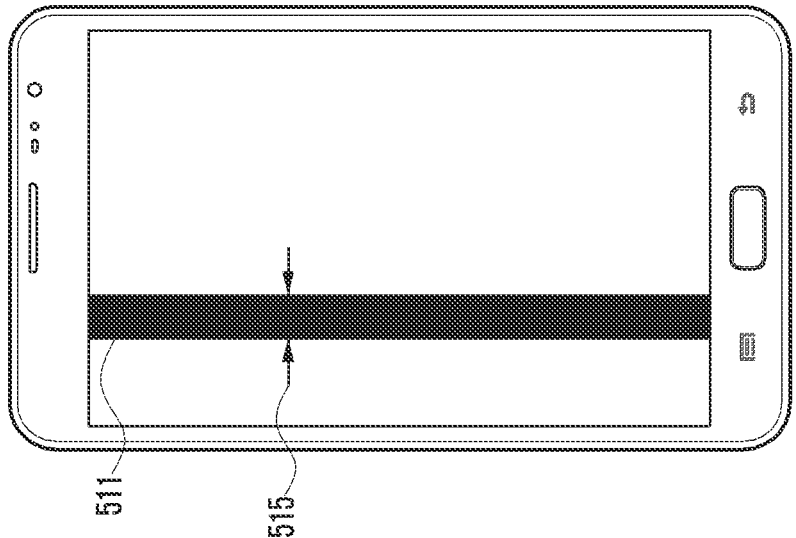
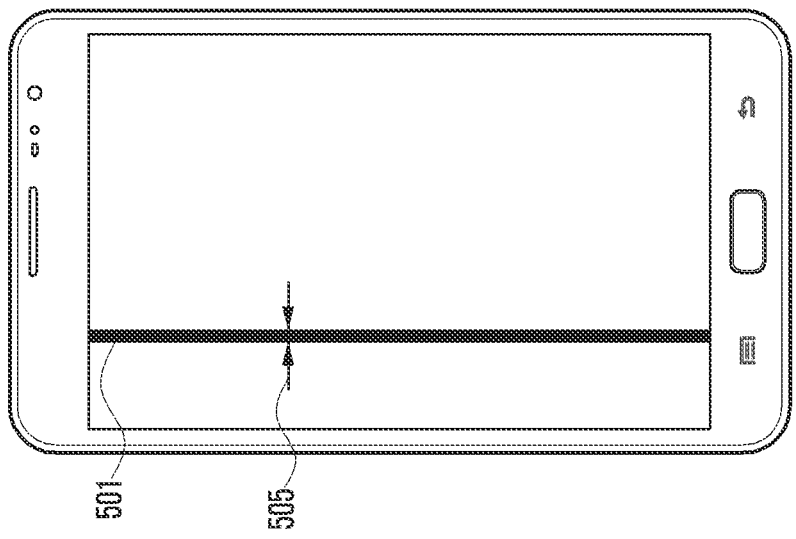

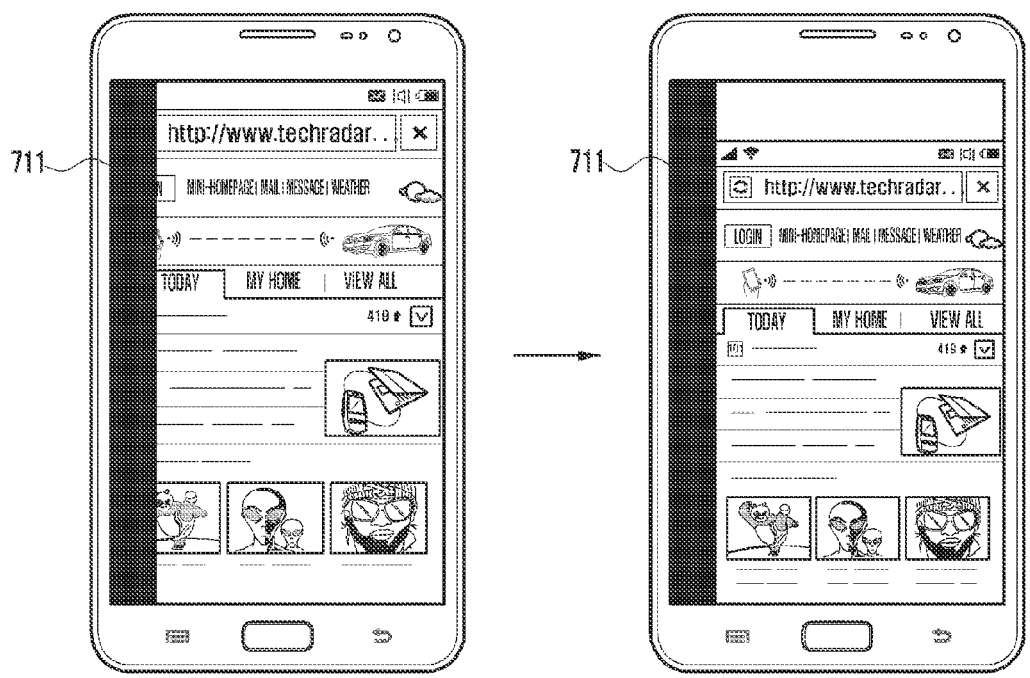

FIG. 8A
FIG. 8B
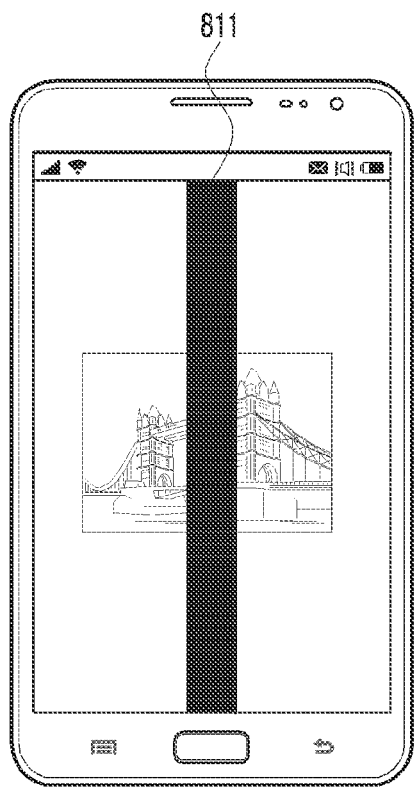
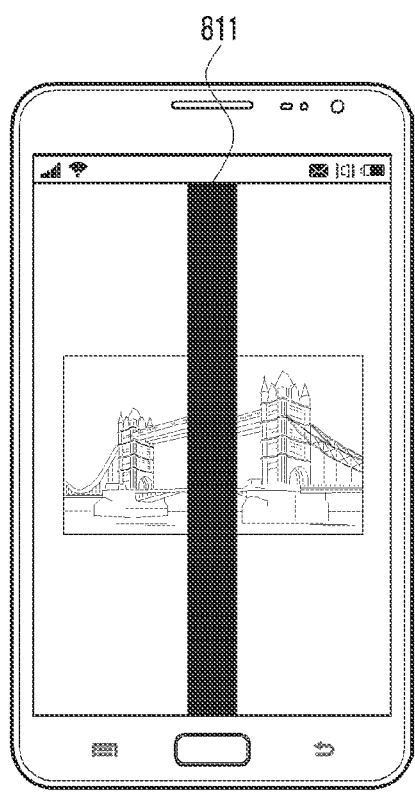

METHOD AND DEVICE FOR CONTROLLING OPERATION ACCORDING TO DAMAGE TO TOUCH AREA OF ELECTRONIC DEVICE

CROSS-REFERENCE TO RELATED APPLICATION(S)

This application claims the benefit under 35 U.S.C. § 119(a) of a Korean patent application filed on Apr. 23, 2014 in the Korean Intellectual Property Office and assigned Serial number 10-2014-0048911, the entire disclosure of which is hereby incorporated by reference.

TECHNICAL FIELD

The present disclosure relates to a method of controlling an operation of an electronic device having a damaged touch area.

BACKGROUND

Currently, electronic devices have been developed to include a touch panel. The touch panels employed for the electronic devices may detect a touch generated by a touch pen for performing a touch function or a user's body part including a finger. The touch panels may have interconnection wires horizontally and vertically formed in a touch detection area thereof and determine the generation of a touch according to a change in electric signals flowing through the respective interconnection wires.

The above information is presented as background information only to assist with an understanding of the present disclosure. No determination has been made, and no assertion is made, as to whether any of the above might be applicable as prior art with regard to the present disclosure.

SUMMARY

The touch panels employed for the electronic devices may include an electrode pattern and a touch Integrated Circuit (IC). The electrode pattern may be constituted by individual touch lines that are horizontally and vertically arranged, and touch generation signals generated from the touch lines constituting the electrode pattern may be transferred via the touch IC. Due to the structure of the touch panels, when some points of the touch panels (e.g., one point of the electrode pattern or a part of the touch IC) are damaged, the touch lines to which the damaged points belong fail to operate a touch recognition function. As some areas of the touch panels are damaged, the electronic devices may fail to recognize a touch or may make an error of recognizing another wrong point, which is not an actual touch point, as a touch point.

Aspects of the present disclosure are to address at least the above-mentioned problems and/or disadvantages and to provide at least the advantages described below. Accordingly, an aspect of the present disclosure is to provide a method and device for controlling an operation according to damage to a touch area of an electronic device which may control an operation of the electronic device to prevent the misrecognition of a touch when a damaged area exists in the touch area of the electronic device.

In accordance with an aspect of the present disclosure, a method of controlling an operation of an electronic device is provided. The method includes detecting a damaged area in a touch area, identifying information on a location and a width of the damaged area, and performing a touch compensation function when a touch is to be compensated for based on the information.

In accordance with another aspect of the present disclosure, an electronic device is provided. The electronic device includes a touch panel and a controller configured to identify information on a location and a width of a damaged area within the touch panel and to perform a touch compensation function by determining whether a touch is to be compensated for based on the information.

In accordance with another aspect of the present disclosure, a computer readable recording medium is provided. The computer readable recording medium includes a program is recorded for executing an operation of detecting a damaged area in a touch area, an operation of identifying information on a location and a width of the damaged area, and an operation of performing a touch compensation function when a touch is to be compensated for based on the information.

Various embodiments of the present disclosure provide a method of detecting damage to a portion of a touch area of an electronic device and changing screen display settings to cope with the detected damage and a method of compensating for a touch generated in the damaged touch area. This helps the electronic device to deduce a touch point indicated by a user without the replacement of a touch panel even though a portion of the touch area is damaged.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A and 5B illustrate damaged touch lines on a touch panel according to an embodiment of the present disclosure;

FIGS. 7A, 7B, 8A and 8B illustrate operations of changing display settings of a screen according to various embodiments of the present disclosure.

Throughout the drawings, it should be noted that like reference numbers are used to depict the same or similar elements, features, and structures.

DETAILED DESCRIPTION

Figure 1:
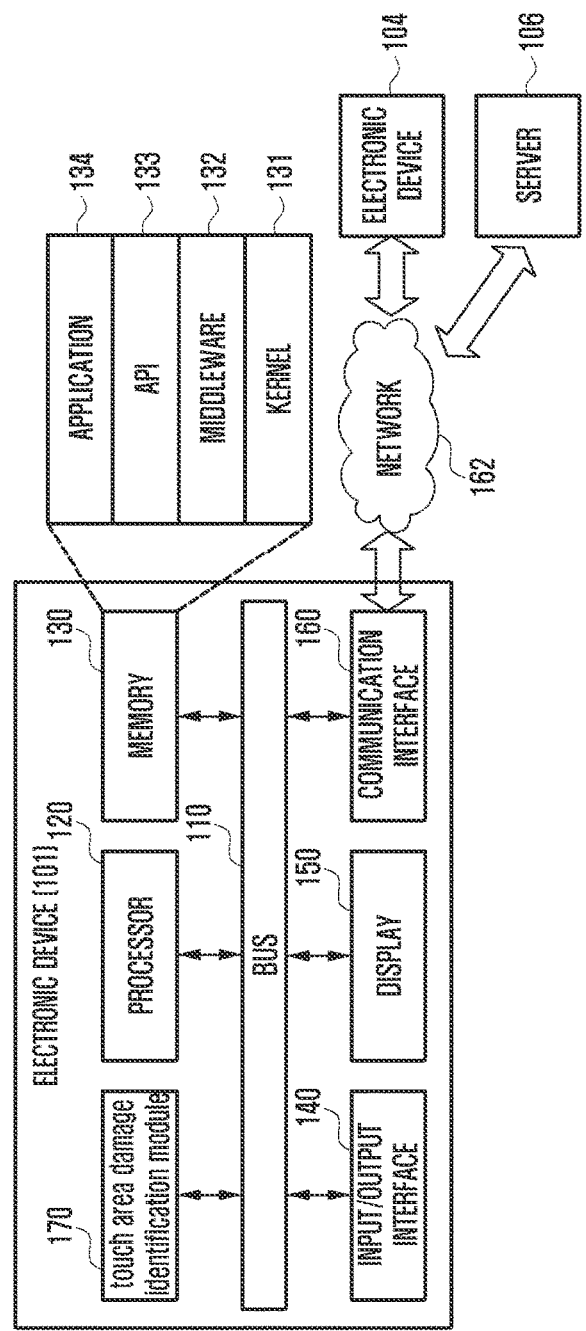
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in various embodiments of the present disclosure denote the presence of the disclosed functions, operations, and constituent elements and do not limit one or more additional functions, operations, and constituent elements. Additionally, in various embodiments of the present disclosure, the terms such as "comprise", "include", and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in various embodiments of the present disclosure, the expression "or" includes any and all combinations of the associated listed words. For example, the expression "A or B" may include A, may include B, or may include both A and B.

In various embodiments of the present disclosure, expressions including ordinal numbers, such as "first" and "second," and the like, and/or the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them the first user device and the second user device are user devices. For example, a first element could be termed a second element, and similarly, a second element could be termed a first element without departing from the scope of the present disclosure.

In the case where according to which a component is referred to as being "connected" or "accessed" to other component, it should be understood that not only the component is directly connected or accessed to the other component, but also there may exist another component between them the component and the other component. Meanwhile, in the case where according to which a component is referred to as being "directly connected" or "directly accessed" to other component, it should be understood that there is no component therebetween.

The terms used in the present disclosure are only used to describe specific various embodiments, and are not intended to limit the present disclosure.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

An electronic device according to the present disclosure may be a device that involves a display function. For example, an electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Pictures Experts Group (MPEG-1 or MPEG-2) Audio Layer 3 (MP3) player, a portable medical device, a digital camera, or a wearable device (e.g., a Head-Mounted Device (HMD) such as electronic glasses, electronic clothes, an electronic bracelet, an electronic necklace, an electronic appcessory, or a smart watch).

According to various embodiments, an electronic device may be a smart home appliance that involves a display function. For example, an electronic device may be a Television (TV), a Digital Video Disk (DVD) player, an audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, and the like), a game console, an electronic dictionary, an electronic key, a camcorder, or an electronic picture frame.

According to various embodiments, an electronic device may be a medical device (e.g., Magnetic Resonance Angiography (MRA), Magnetic Resonance Imaging (MRI), Computed Tomography (CT), ultrasonography, and the like), a navigation device, a Global Positioning System (GPS) receiver, an Event Data Recorder (EDR), a Flight Data Recorder (FDR), a car infotainment device, electronic equipment for ship (e.g., a marine navigation system, a gyrocompass, and the like), avionics, security equipment, an industrial or home robot, an Automatic Teller's Machine (ATM), or a Point of Sales (POS).

According to various embodiments, an electronic device may be furniture or part of a building or construction having a display function, an electronic board, an electronic signature receiving device, a projector, or various measuring instruments (e.g., a water meter, an electric meter, a gas meter, a wave meter, and the like). An electronic device disclosed herein may be one of the above-mentioned devices or any combination thereof In addition, an electronic device disclosed herein may be a flexible device. As well understood by those skilled in the art, an electronic device disclosed herein is not to be considered as a limitation of this disclosure.

Now, an electronic device according to various embodiments will be described with reference to the accompanying drawings. The term 'user' to be used herein may refer to a person or machine (e.g., an artificial intelligence apparatus or system) using an electronic device.

FIG. 1 is a diagram illustrating a network architecture including an electronic device according to various embodiments of the present disclosure.

Referring to FIG. 1, an electronic device 101 includes a bus 110, a processor 120, a memory 130, an input/output interface 140, a display 150, a communication interface 160, and a touch area damage identification module 170.

The bus 110 may be circuitry, which connects the aforementioned components to each other to communicate signals (e.g., control messages) therebetween.

The processor 120 receives a command from any of the aforementioned components (e.g., memory 130, input/output interface 140, display 150, communication interface 160, and touch area damage identification module 170) through the bus 110, interprets the command, and executes operation or data processing according to the decrypted command.

The memory 130 may store the command or data received from the processor 120 or other components (e.g., input/output interface 140, display 150, communication interface 160, touch area damage identification module 170, and the like) or generated by the processor 120 or other components. The memory 130 may store program modules including kernel 131, middleware 132, Application Programming Interface (API) 133, applications 134, and the like. Each programming module may be implemented as software, firmware, hardware, and any combination thereof.

The kernel 131 may control or manage the system resources (e.g., bus 110, processor 120, and memory 130) for use in executing the operation or function implemented with the middleware 132, the API 133, or the application 134. The kernel 131 also may provide an interface allowing the middleware 132, API 133, or application 134 to access the components of the electronic device 101 to control or manage.

The middleware 132 may work as a relay of data communicated between the API 133 or the application 134 and the kernel 131. The middleware 132 may execute control of the task requests from the applications 134 in such a way of assigning priority for use of the system resource (e.g., bus 110, processor 120, and memory 130) of the electronic device to at least one of the applications 134.

The API 133 is the interface for the applications 134 to control the function provided by the kernel 131 or the middleware 132 and may include at least one interface or function (e.g., command) for file control, window control, image control, or text control.

According to various embodiments, the applications 134 may include Short Messaging Service/Multimedia Messaging Service (SMS/MMS) application, email application, calendar application, alarm application, health care application (e.g., application of measuring quantity of motion or blood sugar level), and environmental information application (e.g., atmospheric pressure, humidity, and temperature applications). Additionally or alternatively, the application 134 may be an application related to information exchange between the electronic device 101 and other external electronic device (e.g., an external electronic device 104). Examples of the information exchange application may include a notification relay application for relaying specific information to the external electronic device 104 and a device management application for managing the external electronic device.

For example, the notification relay application may be provided with a function of relaying the alarm information generated by the other applications (e.g., SMS/MMS application, email application, health care application, and environmental information application) of the electronic device to an external electronic device (e.g., the external electronic device 104). Additionally or alternatively, the notification relay application may provide the user with the notification information received from an external electronic device (e.g., the external electronic device 104). The electronic device application may manage (e.g., install, delete, and update) the function of an external electronic device (e.g., turn-on/off of the external electronic device 104 itself (or a part of it) or adjustment of the brightness (or resolution) of the display) which communicates with the electronic device 101 or the service (e.g., communication or messaging service) provided by the external electronic device or an application running on the external device.

According to various embodiments, the applications 134 may include an application designated according to the property (e.g., type) of the external electronic device 104. If the external electronic device is the MP3 player, the applications 134 may include a music playback application. Similarly, if the external electronic device is a mobile medical appliance, the applications 134 may include a heal care application. According to an embodiment, the application 134 may include at least one of applications designated to the electronic device 101 or the applications received from the external electronic device (e.g., a server 106 and the external electronic device 104).

The input/output interface 140 delivers the command or data input by the user through with an input/output device (e.g., sensor, keyboard, and touchscreen) to the processor 120, memory 130, communication interface 160, and/or touch area damage identification module 170 through the bus 110. For example, the input/output interface 140 may provide the processor 120 with the data corresponding to the touch may by the user on the touchscreen. The input/output interface 140 may output the command or data (which is received from the processor 120, memory 130, communication interfaced 160, or the touch area damage identification module 170 through the bus 110) through the input/output device (e.g., speaker and display). For example, the input/out interface 140 may output the voice data processed by the processor 120 to the user through the speaker.

The display 150 may present various information (e.g., multimedia data and text data) to the user.

The communication interface 160 may establish a communication connection of the electronic device 101 with an external device (e.g., the external electronic device 104 and the server 106). For example, the communication interface 160 connects to a network 162 through a wireless or wired link for communication with the external device. Examples of the wireless communication technology may include wireless fidelity (Wi-Fi), Bluetooth (BT), Near Field Communication (NFC), GPS, and cellular communication technology (e.g., Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM). Examples of the wired communication technology may include Universal Serial Bus (USB), High Definition Multimedia Interface (HDMI), Recommended Standard 232 (RS-232), and Plain Old Telephone Service (POTS).

According to an embodiment, the network 162 may be a telecommunication network. The communication network may include at least one of computer network, Internet, Internet of Things, and telephone network. According to an embodiment, the communication protocol between the electronic device 101 and an external device (e.g., transport layer protocol, data link layer protocol, and physical layer protocol) may be supported by at least one of the applications 134, API 133, middleware 132, kernel 131, and communication interface 160.

The touch area damage identification module 170 may be driven while being connected to the touch panel (not illustrated) of the input/output interface 140. For example, the touch area damage identification module 170 may detect a change in signal generated in the touch panel and thus, identify whether the touch area of the touch panel is damaged.

A process will be described in which the touch area damage identification module 170 identifies the damage to the touch area. For example, the touch panel may generate a signal of a first value when a touch is not input and a signal of a second value when a touch is input. In this way, in order to distinguish whether a touch is generated, the touch panel may generate signals with different magnitudes when the touch is input and when the touch is not input and may always generate a signal of a predetermined value (a first magnitude) even when the touch is not input. Accordingly, even when a touch is not generated, a signal of a predetermined value always flows, and therefore, the touch area damage identification module 170 may determine trouble of the touch panel when the touch panel does not detect the signal. In the same way, when a signal corresponding to a particular interconnection wire of the touch panel is not detected, the touch area damage identification module 170 may determine damage to the corresponding interconnection wire. In addition, the touch area damage identification module 170 may determine only whether a damaged point exists in the touch area separately from the processor 120.

According to another embodiment, the touch area damage identification module 170 may identify the location of a damaged interconnection wire inside the processor 120 and the width of a damaged area based thereon. The location and the role of the touch area damage identification module 170 may vary according to various embodiments.

Hereinafter, a configuration of an electronic device according to various embodiments of the present disclosure will be described with reference to FIG. 2.

Figure 2:
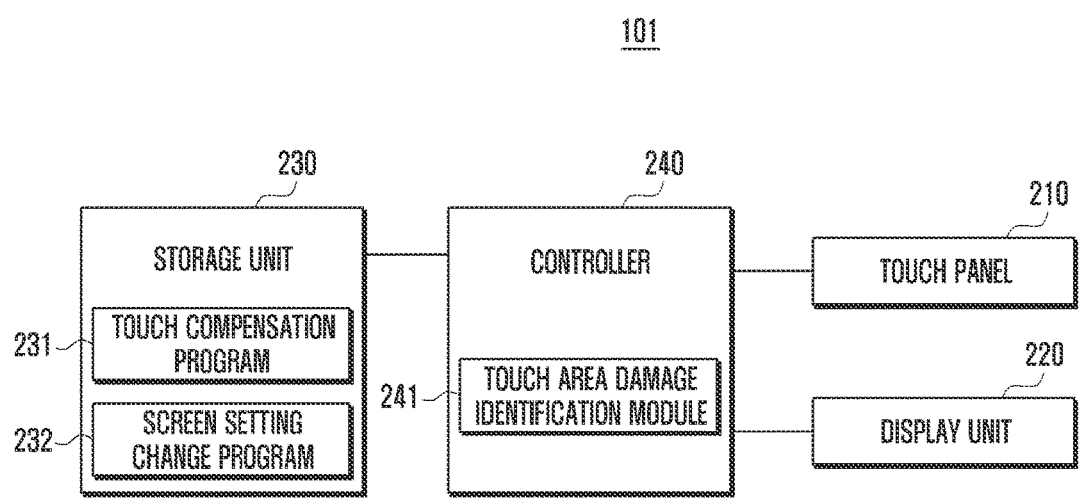
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, an electronic device 101 according to the embodiment of the present disclosure may include a touch panel 210, a display unit 220, a storage unit 230, and a controller 240. The storage unit 230 may store a touch compensation program 231 and a screen setting change program 232. The controller 240 may include a touch area damage identification module 241.

According to an embodiment, the touch panel 210 is used to detect a user's touch input. The touch panel 210 may be of a capacitive overlay type, a resistive overlay type, or an infrared beam type. In addition to the aforementioned types, any type of touch panel that may detect contact or pressure of an object may be used as the touch panel 210. The touch panel 210 detects the user's touch input and the location of a point where a touch is generated. Only for a touch generated in an undamaged touch area, the touch panel 210 according to the embodiment of the present disclosure may transfer a touch generation signal to the controller 240.

According to an embodiment, the display unit 220 may be integrally formed with the touch panel 210 and may be formed of a Liquid Crystal Display (LCD), an Organic Light Emitting Diode (OLED), or an Active Matrix OLED (AMOLED). The display unit 220 may visually provide the user with various types of information, such as a menu of the electronic device, input data, and function setup information. When an arbitrary touch line is damaged, the display unit 220 according to the embodiment of the present disclosure may change screen settings (e.g., scale down a screen) to display the screen in an area where a damaged touch line does not exist under control of the controller 240. In addition, when a particular touch line in a touch area is damaged, the display unit 220 may display a portion of a screen having the same size in an area where a touch line is not damaged and may move the displayed screen to display the portion of the screen according to the user selection.

According to an embodiment, the storage unit 230 serves to store programs and data necessary for operations of the electronic device. The storage unit 230 according to the embodiment of the present disclosure may store the touch compensation program 231 and the screen setting change program 232. The touch compensation program 231 and the screen setting change program 232 may be activated when an arbitrary touch line within the touch area is damaged. The touch compensation program 231 may perform a function of compensating for a touch generated near the damaged touch line. In addition, when the damaged touch line is detected, the screen setting change program 232 may accordingly change screen display settings (e.g., scale down the screen or divide the screen) to display the screen.

According to an embodiment, the controller 240 controls an overall operation of the electronic device. The controller 240 according to the embodiment of the present disclosure may include the touch area damage identification module 241. The touch area damage identification module 241 may identify whether the damaged touch line exists in the touch panel 210 based on a signal transferred from the touch panel 210. For example, the touch area damage identification module 241 may determine that a touch line is damaged when an input signal of a predetermined value is not identified through the touch line of the touch panel 210 in a non-contact state. In addition, when the damaged touch line is detected, the touch area damage identification module 241 may identify information on a damaged area including the damaged touch line. The information on the damaged area may include width information of the damaged area including damaged touch lines that are located side by side as well as location information (e.g., a coordinate value) of the damaged area.

According to an embodiment, when the touch area damage identification module 241 identifies damage to a particular touch line, the controller 240 may determine whether a touch compensation function is possible. In this case, the controller 240 may determine whether a distance by which the damaged touch line is separated from a close periphery (or an area between the damaged touch line and the close periphery) is greater than or equal to a threshold value, based on the information identified by the touch area damage identification module 241. For example, the controller 240 may execute the touch compensation function according to whether the separation distance is greater than or equal to the threshold value.

According to an embodiment, the controller 240 may execute the screen setting change program 132 when detecting a damaged touch line. For example, when a damage area includes the outermost touch line, the controller 240 may display a reduced screen in an undamaged area rather than the damaged area. Alternatively, the controller 240 may display a portion of a screen only in the undamaged area except for the damaged area on the screen. For example, the controller 240 may not temporarily display the image which has been displayed in the damaged area and may display only the image which has been displayed in the undamaged area. In this case, the image which is not temporarily displayed may be displayed in the undamaged area in correspondence to a user input (a button selection or a motion for moving a screen (e.g., a drag or a touch)).

According to an embodiment, the controller 240 may execute the touch compensation program 231 when detecting the damaged touch line. The touch compensation program 231, when a multi-touch in proximity to the damaged touch line (the proximity is determined based on a preset threshold value) is determined as a misrecognized touch, may compensate for the misrecognized touch. To this end, when compensating for the misrecognized touch, the controller 240 may obtain a particular point between coordinates of the multi-touch that has been detected near the damaged touch line and then process the particular point into a point where a single touch is generated. For example, the particular point may be set as a midpoint between the two coordinates or one point on the damaged touch line between the two coordinates.

The term 'threshold value' has been used to describe the operation of the controller 240. In the present specification, the term 'threshold value' may refer to a reference value that is used to distinguish a level of a particular numerical value (e.g., the width of a damaged area, a distance by which a damaged touch line is separated from a close periphery, or a distance between a touch point and a damaged area). A threshold value may vary depending upon the type of applied numerical value. For example, a threshold value applied to the width of the damaged area and a threshold value applied to the distance between the touch point and the damaged area may differ from each other. In addition, when a numerical value representing a separation distance (e.g., a distance by which the damaged touch line is separated from the close periphery or a distance between the touch point and the damaged area) is not greater than a threshold value, two separated points may be expressed as being close (or adjacent) to each other. Hereinafter, the expression "close" may be regarded as meaning a case where a distance by which a particular point is separated from a reference point is less than or equal to a predefined threshold value.

Hereinafter, a method of controlling an operation according to an embodiment of the present disclosure will be described with reference to the accompanying drawings.

Figure 3A:
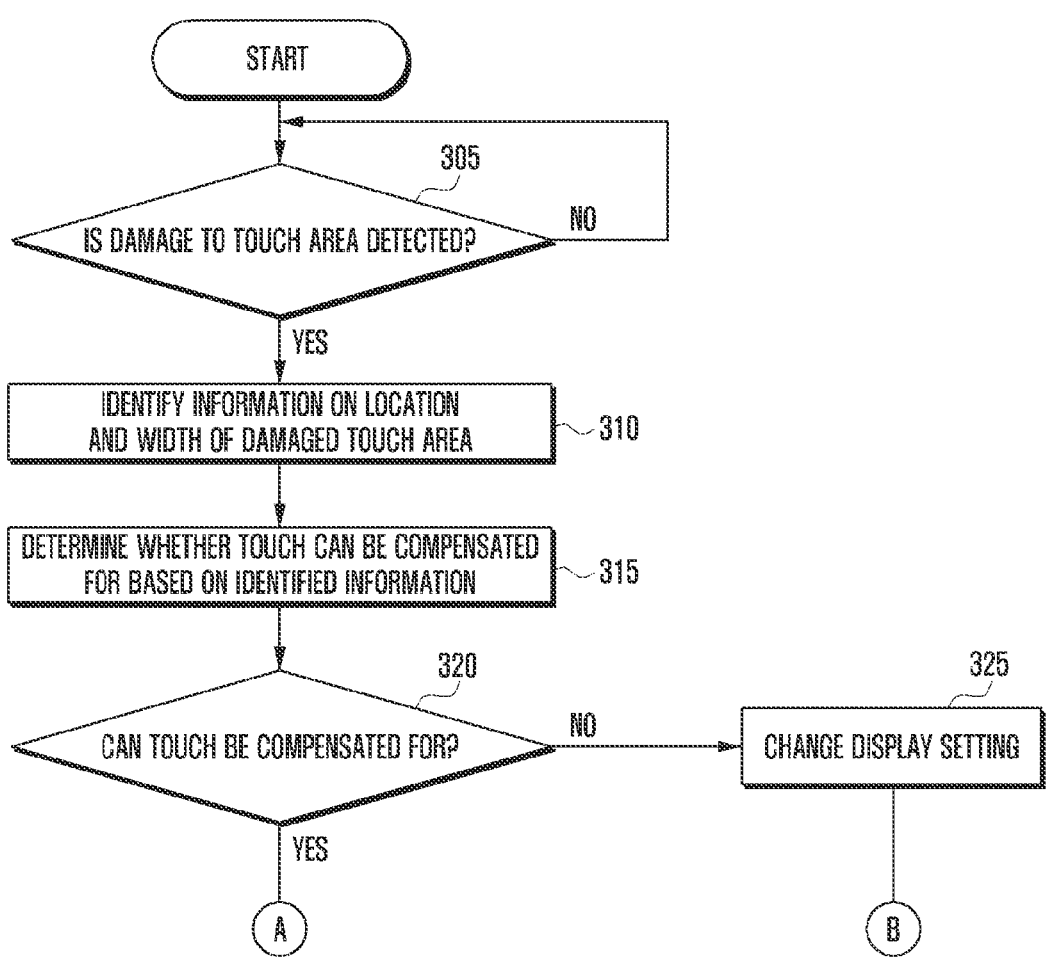
FIGS. 3A and 3B are flowcharts illustrating a method of controlling an operation according to damage to a touch area of an electronic device according to an embodiment of the present disclosure.
Figure 3B:
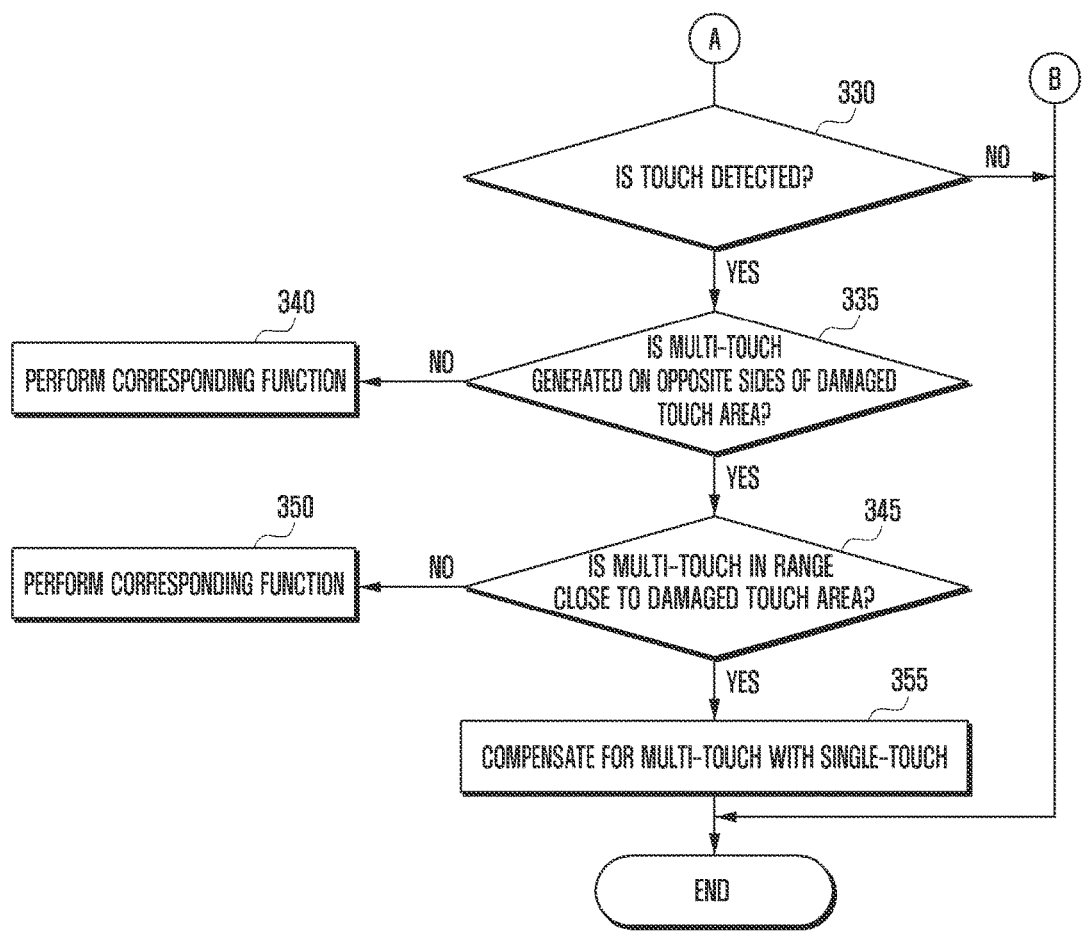

FIGS. 3A and 3B are flowcharts illustrating a method of controlling an operation according to damage to a touch area of an electronic device according to an embodiment of the present disclosure.

Referring to FIGS. 3A and 3B, in operation 305, the controller 240 of the electronic device according to the embodiment of the present disclosure may identify whether damage to a touch area is detected. A description of damage to a touch line of the touch panel 210 will be given with reference to FIG. 4.

Figure 4:
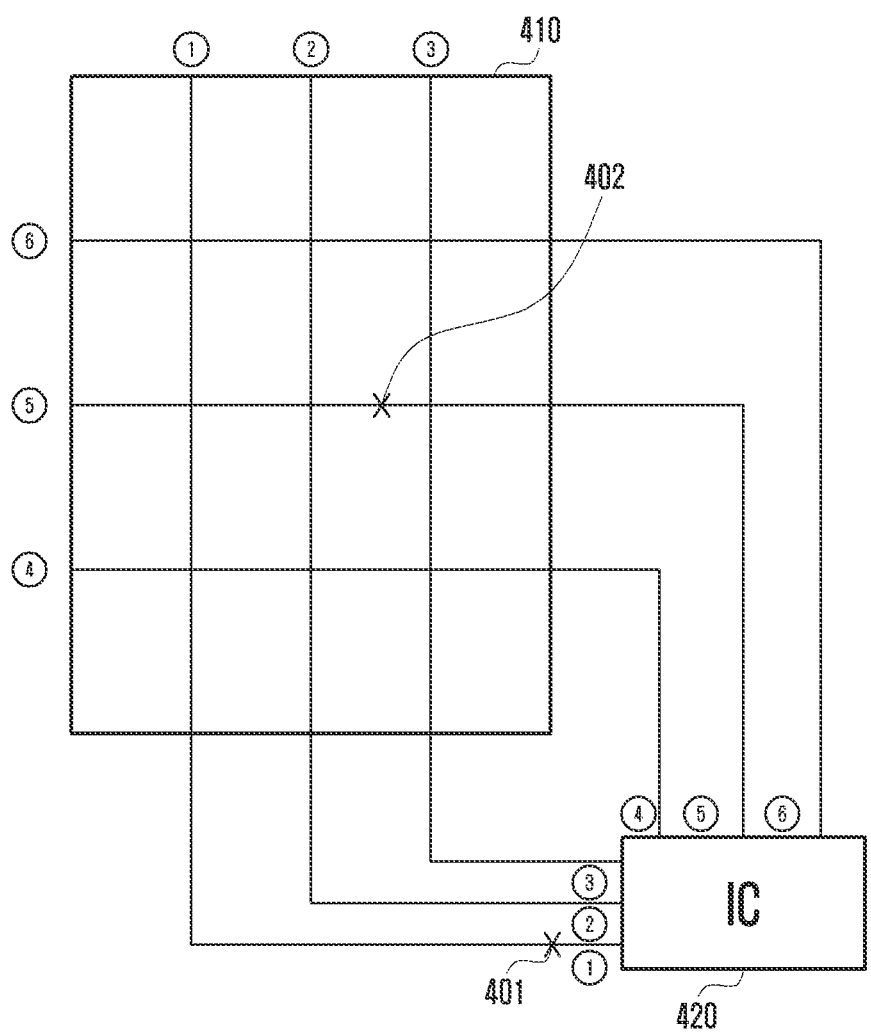
FIG. 4 illustrates a structure of a touch panel of an electronic device according to an embodiment of the present disclosure.

FIG. 4 illustrates a structure of a touch panel of an electronic device according to an embodiment of the present disclosure.

FIG. 4 illustrates configurations of the touch panel 210. According to an embodiment, the touch panel 210 may include a substrate 410 having interconnection wires formed thereon and a touch Integrated Circuit (IC) 420. The touch IC 420 may send electric signals to the respective interconnection wires of the substrate 410 and identify the returning electric signals. The interconnection wires may be horizontally and vertically formed on the upper and lower portions of the substrate 410. The interconnection wires may serve as touch lines for identifying the location of a touch point. The touch area damage identification module 241 may identify whether the touch lines formed on the substrate 410 or the touch IC 420 is damaged, based on signals detected by the touch IC 420. A predetermined level of current always flows in the touch panel 210. Accordingly, the touch IC 420 may detect electric signals of a predetermined level or electric signals of a lower level due to a touch. However, when the touch lines on the substrate 410 or interconnection lines constituting the touch IC are damaged at one point thereof, the touch IC 420 may not detect any signals in relation to the damaged touch lines. For example, the touch IC 420 does not detect any signals corresponding to line 1 illustrated in FIG. 4 when the line 1 is damaged at a point 401 thereof, and does not detect any signals corresponding to line 5 when the line 5 is damaged at a point 402 thereof like the line 1. Using this principle, the touch area damage identification module 241 may identify the presence of a touch line where current flow is not detected to determine a presence or absence of a damaged touch line or the location of the damaged touch line.

According to the embodiment, when the controller 240 does not detect any damaged touch line on the touch panel 210 in operation 305, that is, when damage to the touch area is not detected, the controller 240 may perform the operation 305 again. In contrast, when a damaged touch area is identified in operation 305, the controller 240 may perform operation 310. According to an embodiment, when the damaged touch area is identified, the controller 240 may perform an operation of identifying the width of a user's finger. For example, the controller 240 may inform the user that the touch panel is damaged and display a popup window for identifying the width of the user's finger or provide a function of inputting a finger width in the settings.

In operation 310, the controller 240 may identify information on the location and width of the damaged touch area. In this case, in order to identify the location of the damaged area, the controller 240 may identify coordinate information of a touch line where a signal of a predetermined reference value is not detected. When the location coordinates of the damaged touch line are identified, the controller 240 may identify information on a distance between undamaged touch lines on opposite sides of the damaged touch line. The distance between the undamaged touch lines on the opposite sides of the damaged touch line may directly correspond to the width of the damaged area.

According to the embodiment, when the location and the width of the damaged touch area are identified, the controller 240 may determine whether a touch may be compensated for, based on the identified information in operation 315. An operation of compensating for a touch will be described below. For example, the operation of determining whether a touch may be compensated for may correspond to an operation of determining whether the width of the damaged area (the damaged touch area) is greater than a threshold value. The threshold value applied to the width of the damaged area may be set to correspond to the width of a touch area where a signal is detected when a user touches the touch panel with his/her finger. For example, when a damaged area has a larger width than the user's finger, the controller 240 may determine that the touch cannot be compensated for. A description thereabout will be given with reference to FIG. 5.

FIGS. 5A and 5B illustrate damaged touch lines on a touch panel according to an embodiment of the present disclosure.

Referring to FIG. 5A, a touch panel on which a damaged area 501 exists is illustrated. According to an embodiment, in order to determine whether a touch on the touch panel may be compensated for, the controller may identify the width 505 of the damaged area 501. The width 505 of the damaged area 501 may be determined based on a distance between the closest undamaged touch lines on opposite sides of a damaged touch line.

Referring to FIG. 5B, the width of a damaged area 511 is indicated by reference numeral 515. For example, when the width of a damaged area which is set as an available condition for a touch compensation function is smaller than the width indicated by reference number 515, it may be determined that the touch compensation function cannot be performed on the damaged area 511. In addition, the controller may determine a possibility of compensation for a touch, based on whether the damaged area includes the outermost touch line of the touch panel 210. For the touch compensation function, signals have to be detected from opposite sides of a damaged area. However, when a damaged area includes the outermost touch line of the touch panel 210, touch signals are not detected from opposite sides of the damaged area, and therefore the touch compensation function may not be performed. Accordingly, the controller 240 may determine a possibility of compensation for a touch by identifying whether the width of a damaged area is greater than a preset threshold value or whether the damaged area is near the outermost region of the touch panel 210. When it is determined in operation 320 that compensation for a touch is possible, the controller 240 may perform operation 330 of FIG. 3B. In contrast, when it is determined in operation 320 that compensation for a touch is impossible, the controller may make a control to change display settings in operation 325. The operation of changing the display settings may correspond to an operation of moving a screen to a side of the display unit 220 or scaling down a screen to display it on a side of the display unit 220. A specific description of the operation 335 will be given below.

According to the embodiment, the controller 240 may perform a touch compensation function after operation 330 of FIG. 3B. When the controller 240 identifies that a touch is detected in operation 330, the controller 240 may determine whether the detected touch is a multi-touch generated on opposite sides of the damaged touch area in operation 335. When the touch is not the multi-touch generated on the opposite sides of the damaged area, the controller 240 may perform the corresponding function in operation 340. The corresponding function may be, for example, a function of inputting a single touch or a multi-touch on an undamaged area. In contrast, when it is identified in operation 335 that the detected touch is the multi-touch implemented by touch signals generated on the opposite sides of the damaged area, the controller 240 may identify whether the multi-touch is separated a threshold value or less from the damaged area in operation 345. When the separation distance is smaller than the threshold value, the controller 240 may determine the separation distance as a close distance by which the multi-touch may be compensated for. A touch compensation function may prevent a single touch input by a user from being misrecognized as a multi-touch due to a damaged area. Therefore, a misrecognized touch may be acknowledged only for a multi-touch that is generated very close to a damaged area. For example, the multi-touch may be a touch that is generated within a distance of a threshold value or less from the damaged area and detected through touch lines including undamaged close touch lines on opposite sides of the damaged area. When it is determined in operation 345 that the multi-touch has not been generated within a distance of a threshold value or less which may be determined as a distance close to the damaged area, the controller 240 may perform the corresponding function in operation 350. For example, in operation 350, the controller 240 may detect a multi-touch generated at two points that are not close to the damaged area and perform the corresponding function. In contrast, when it is determined that the multi-touch has been generated as touch signals on the close opposite sides of the damaged area (the closeness may be determined by identifying whether the separation distance is the threshold value or less), the controller 240 may process the multi-touch into a single touch in operation 355. A method of determining a touch point to process the multi-touch into a single touch will be described with reference to FIG. 6.

FIGS. 6A, 6B, 6C and 6D illustrate a function of compensating for a touch according to an embodiment of the present disclosure.

Figure 6A:
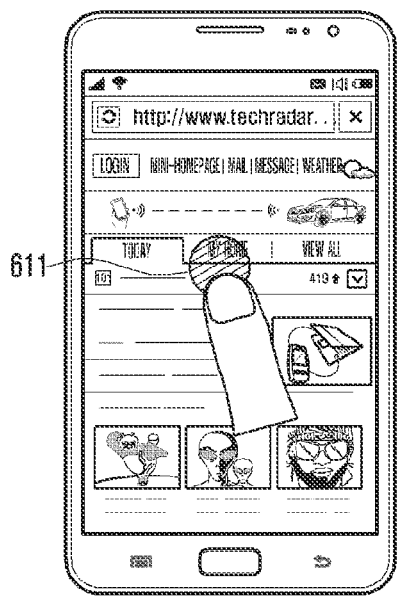
FIGS. 6A, 6B, 6C and 6D illustrate a function of compensating for a touch according to an embodiment of the present disclosure.

Referring to FIG. 6A, a normal touch on a touch panel is illustrated. According to an embodiment, a user touches a screen with his/her finger, whereby one point 611 on the screen is selected.

Figure 6B:
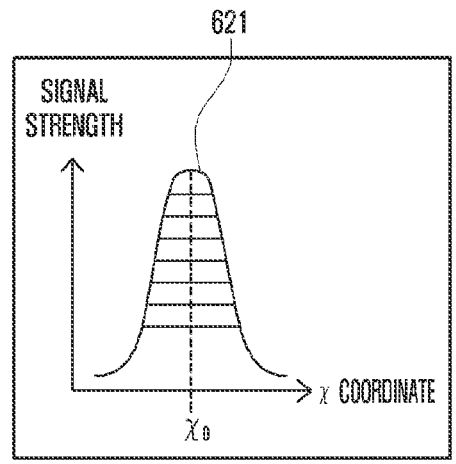

Referring to FIG. 6B, a graph illustrating signal strength corresponding to the single touch is illustrated. A peak 621 represents the strength of a signal corresponding to the single touch on the point 611. In this way, one peak is obtained for the single touch.

Figure 6C:
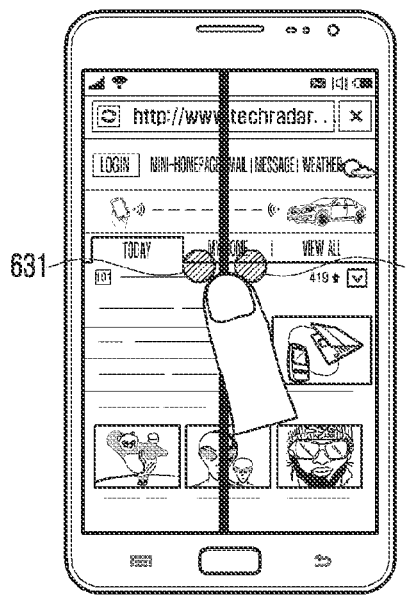

Referring to FIG. 6C, the user touches the same point on the screen, and the touch point is on the damaged touch line 501. Even though the user wants to input the same single touch as that on the point 611, the touch may be detected at two points 631 and 632 on opposite sides of the damaged touch line 501.

Figure 6D:
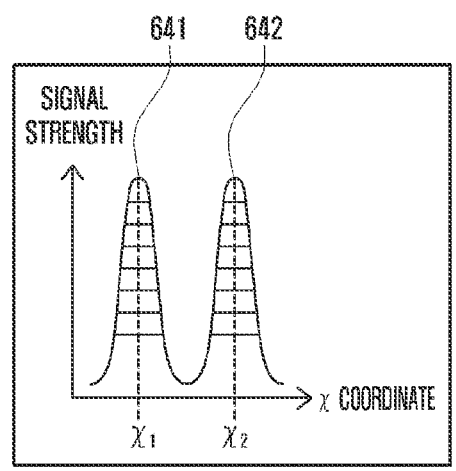

Referring to FIG. 6D, signal strengths relevant to the touches on the two points 631 and 632 may correspond to peaks 641 and 642, respectively. In this case, the X coordinate of the touch point corresponding to the peak 641 may be X1, and the X coordinate of the touch point corresponding to the peak 642 may be X2. When the single touch is input on the area including the damaged touch line 501 as described above, the touch may be recognized as a multi-touch. Accordingly, through an operation of processing a multi-touch into a single touch, an error may be corrected only for a multi-touch generated within a predetermined distance from the damaged touch line 501. To correct the touch misrecognized as the multi-touch, an operation of recognizing the touch point on the damaged touch line 501 may be performed. For example, when correcting the multi-touch detected as illustrated in FIG. 6D into a single touch, the controller 240 may obtain the X coordinate of the touch point which is not detected due to the damaged touch line, by calculating the mean of X1 and X2 illustrated in FIG. 6D. Namely, the X coordinate of the undetected touch point, X3 may be obtained by equation $X3=(X1+X2)/2$. In order to process the misrecognized multi-touch into a single touch, the controller 240 may obtain the single touch coordinate of the undetected touch point from the mean of X1 and X2 which are the coordinates of the detected touches. In addition, the single touch coordinate may be obtained through various other methods. For example, the controller 240 may select a particular point between X1 and X2 (e.g., an object, such as an icon, a link, and a button, in the damaged area (between X1 and X2) or the coordinate thereof) to process the particular point between X1 and X2 into a single touch. According to an embodiment, when the controller 240 cannot use the method of processing a misrecognized multi-touch into a single touch, the controller 240 may carry out a method of changing display settings of a screen. A description thereabout will be given with reference to FIGS. 7A, 7B, 8A and 8B.

FIGS. 7A, 7B, 8A and 8B illustrate operations of changing display settings of a screen according to various embodiments of the present disclosure.

Referring to FIGS. 7A and 7B, a damaged area 711 (including the outermost touch line) exists on the outermost side of the display unit 220. Although the damaged area 711 may not be distinguished with a user's eye, the damaged area 711 is distinguishably displayed for convenience of description. According to an embodiment, the controller 240 may make a control to change display settings according to whether the damaged area 711 includes the touch line on the outermost side of the screen, irrespective of whether the width of the damaged area 711 is larger than a predefined threshold value. The damaged area 711 located on the leftmost side of the screen. When the damaged area 711 is located on the outermost side of the screen as illustrated in FIG. 7A, the controller 240 may scale down the screen, fully displayed on the display unit 220 in FIG. 7A, to display the screen as illustrated in FIG. 7B.

According to an embodiment, even when the damaged area 711 is located on the outermost side of the screen, a touch compensation function may be performed. When a single touch signal is detected through a touch line that is close to the damaged area 711 including the outermost touch line, the controller 240, assuming that a signal is detected through the outermost touch line, may compensate for the touch point by making use of an intermediate position between the outermost touch line and the touch line where the single touch is detected since the controller 240 has already known the damage to the outermost touch line. However, depending upon the width of the damaged area, a threshold value that may be compensated for may be smaller than when the damaged area does not include the outermost touch line, and only the damaged area or the bezel of the electronic device is touched so that a touch signal cannot be generated.

Referring to FIGS. 8A and 8B, an operation will be described which is executed when a touch compensation function is impossible due to a damaged area on the touch panel 210 having a width of a preset threshold value or more. A damaged area 811 is located in the center of the touch panel 210. The damaged area 811 may be constituted by one or more damaged touch lines. Although the damaged area 811 may not be distinguishably displayed on a screen in practice, the damaged area 811 is visually distinguishably displayed only for convenience of description. Accordingly, in the case of FIG. 8A, there is no problem in performing a function of actually displaying an image. However, a touch may not be recognized through the damaged area 811. According to the embodiment, when determining that the width of the damaged area 811 is greater than a threshold value for the compensation for a touch, the controller 240 may divide the screen with respect to the damaged area 811 and display the screen as illustrated in FIG. 8B. When the divided screen is displayed as illustrated in FIG. 8B, a user may view the portion corresponding to the damaged area 811. In addition, when the screen is divided due to the damaged area 811, a notification for informing the division of the screen may be displayed, or the function of dividing and displaying a screen may be disabled.

As described above, a method of controlling an operation of an electronic device according to various embodiments of the present disclosure may include: detecting a damaged area in a touch area; identifying information on a location and a width of the damaged area; and performing a touch compensation function when a touch is to be compensated for based on the identified information.

A method of controlling an operation of an electronic device according to various embodiments of the present disclosure may include: detecting a damaged area in a touch area; identifying information on a location and a width of the damaged area; and performing a touch compensation function when a touch is to be compensated for based on the identified information. The damaged area may include at least one damaged touch line of touch lines constituting the touch area. The performing of the touch compensation function may include: detecting a touch; determining that the touch is a multi-touch generated on opposite sides of the damaged area; identifying that a distance by which the multi-touch is separated from the damaged area is smaller than a threshold value; and processing the multi-touch into a single touch. In this case, the processing of the multi-touch into the single touch may include deducing a coordinate of an unrecognized touch point by obtaining a particular point between coordinates (e.g., the mean of the coordinates) of the multi-touch.

The method may further include changing display settings of a screen when a touch is not to be compensated for based on the information. The changing of the display settings of the screen may be performed when the damaged area includes a touch line located on the outermost side of the touch area based on the identified information and/or when the width of the damaged area is greater than a threshold value. The changing of the display settings of the screen may include displaying the screen having a reduced size in an undamaged area when it is determined based on the identified information that the damaged area includes the touch line located on the outermost side of the touch area. When it is determined based on the identified information that the width of the damaged area is greater than a threshold value, the screen may be divided and displayed in undamaged areas on opposite sides of the damaged area. The changing of the display settings of the screen may include displaying a portion of the screen in an undamaged area when the width of the damaged area is greater than the threshold value. The remaining portion which is not displayed in the undamaged area may be moved to and displayed in the undamaged area according to a user selection.

Figure 9:
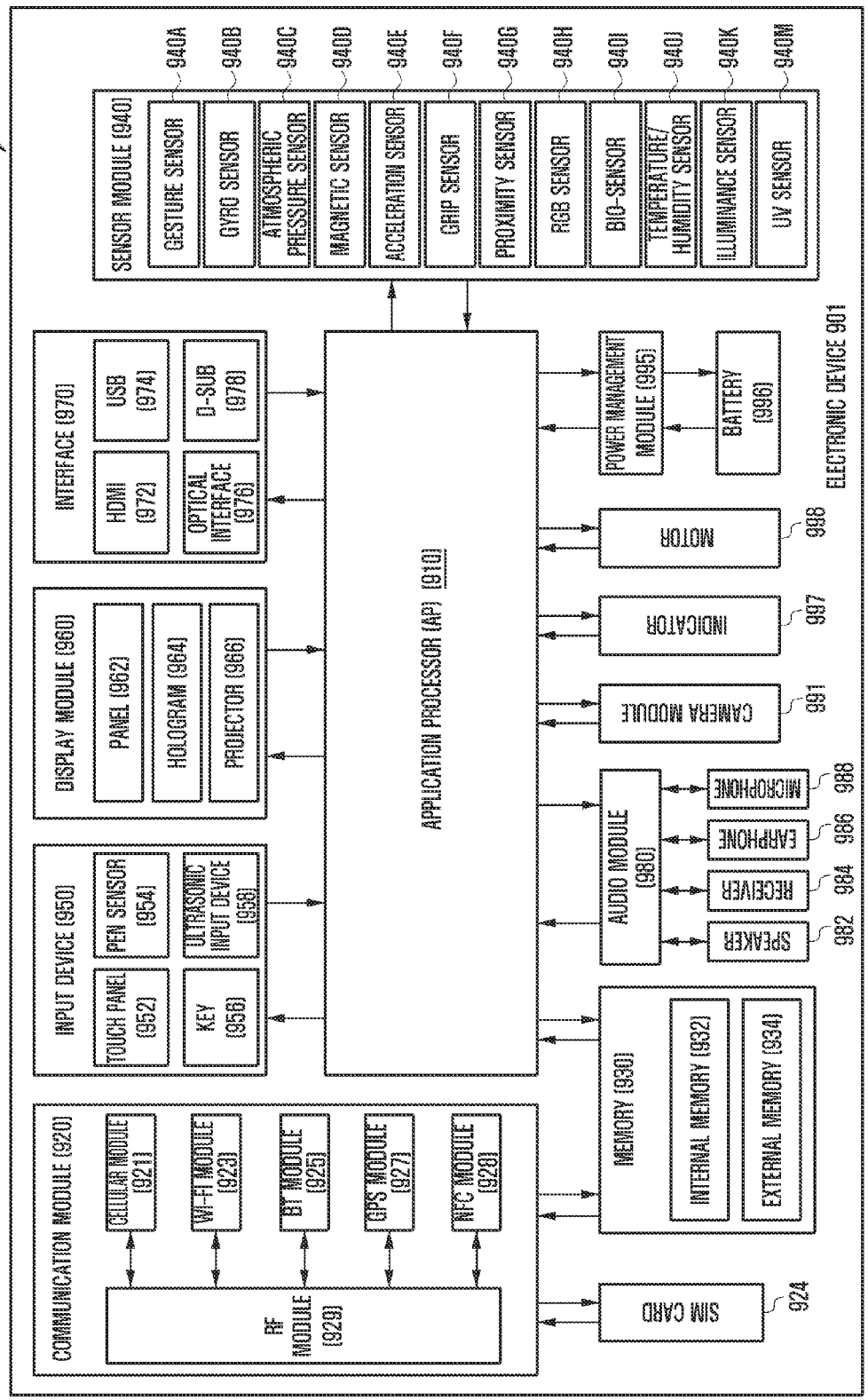
FIG. 9 is a block diagram of an electronic device according to various embodiments of the present disclosure.

FIG. 9 is a block diagram illustrating a configuration of an electronic device according to various embodiments of the present disclosure.

Referring to FIG. 9, an electronic device 901 may be of the whole or a part of the electronic device 101. The electronic device 901 may include an Application Processor (AP) 910, a communication module 920, a Subscriber Identity Module (SIM) card 924, a memory 930, a sensor module 940, an input device 950, a display 960, an interface 970, an audio module 980, a camera module 991, a power management module 995, a battery 996, an indicator 997, and a motor 998.

The AP 910 may operate an Operating System (OS) and/or application programs to control a plurality of hardware and/or software components connected to the AP 910 and perform data-processing and operations on multimedia data. For example, the AP 910 may be implemented in the form of System on Chip (SoC). According to an embodiment, the AP 910 may include a Graphic Processing Unit (GPU) (not shown).

The communication module 920 (e.g., communication interface 160) may perform data communication with other electronic devices (e.g., the external electronic device 104 and the server 106) through a network. According to an embodiment, the communication module 920 may include a cellular module 921, a Wi-Fi module 923, a BT module 925, a GPS module 927, an NFC module 928, and a Radio Frequency (RF) module 929.

The cellular module 921 is responsible for voice and video communication, text messaging, and Internet access services through a communication network (e.g., LTE, LTE-A, CDMA, WCDMA, UMTS, WiBro, and GSM networks). The cellular module 921 may perform identification and authentication of electronic devices in the communication network using the SIM card 924. According to an embodiment, the cellular module 921 may perform at least one of the functions of the AP 910. For example, the cellular module 921 may perform at least a part of the multimedia control function.

According to an embodiment, the cellular module 921 may include a Communication Processor (CP). The cellular module 921 may be implemented in the form of SOC. Although the cellular module 921 (e.g., communication processor), the memory 930, and the power management module 995 are depicted as independent components separated from the AP 910, the present disclosure is not limited thereto but may be embodied in a way that the AP includes at least one of the components (e.g., the cellular module 921).

According to an embodiment, each of the AP 910 and the cellular module 921 (e.g., communication processor) may load a command or data received from at least one of the components on a non-volatile or volatile memory and process the command or data. The AP 910 or the cellular module 921 may store the data received from other components or generated by at least one of other components in the non-volatile memory.

Each of the Wi-Fi module 923, the BT module 925, the GPS module 927, and the NFC module 928 may include a processor for processing the data it transmits/receives. Although the cellular module 921, the Wi-Fi module 923, the BT module 925, the GPS module 927, and the NFC module 928 are depicted as independent blocks; at least two of them (e.g., communication processor corresponding to the cellular module 921 and Wi-Fi processor corresponding to the Wi-Fi module 923) may be integrated in the form of SoC.

The RF module 929 is responsible for data communication, for example, transmitting/receiving RF signals. Although not depicted, the RF module 929 may include a transceiver, a Power Amp Module (PAM), a frequency filter, and a Low Noise Amplifier (LNA). The RF module 929 also may include the elements for transmitting/receiving electric wave in free space (e.g., conductor or conductive wire). Although FIG. 9 is directed to the case where the Wi-Fi module 923, the BT module 925, the GPS module 927, and the NFC module 928 are sharing the RF module 929, the present disclosure is not limited thereto but may be embodied in a way that at least one of the Wi-Fi module 923, the BT module 925, the GPS module 927, and the NFC module 928 transmits/receives RF signals an independent RF module.

The SIM card 924 may be designed so as to be inserted into a slot formed at a predetermined position of the electronic device. The SIM card 924 may store unique identity information (e.g., Integrated Circuit Card Identifier (IC-CID)) or subscriber information (e.g., International Mobile Subscriber Identity (IMSI)).

The memory 930 (e.g., memory 130) may include at least one of the internal memory 932 and an external memory 934. The internal memory 932 may include at least one of a volatile memory (e.g., a Dynamic Random Access Memory (DRAM), a Static RAM (SRAM), a Synchronous Dynamic RAM (SDRAM)) or a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, and a Not OR (NOR) flash memory)

According to an embodiment, the internal memory 932 may be a Solid State Drive (SSD). The external memory 934 may be a flash drive such as Compact Flash (CF), Secure Digital (SD), micro-SD, Mini-SD, extreme Digital (xD), and a Memory Stick. The external memory 934 may be connected to the electronic device 901 through various interfaces functionally. According to an embodiment, the electronic device 901 may include a storage device (or storage medium) such as hard drive.

The sensor module 940 may measure physical quantity or check the operation status of the electronic device 901 and convert the measured or checked information to an electric signal. The sensor module 940 may include at least one of gesture sensor 940A, Gyro sensor 940B, atmospheric pressure sensor 940C, magnetic sensor 940D, acceleration sensor 940E, grip sensor 940F, proximity sensor 940G, color sensor 940H (e.g., Red, Green, Blue (RGB) sensor), bio sensor 9401, temperature/humidity sensor 940J, illuminance sensor 940K, and Ultra Violet (UV) sensor 940M. Additionally or alternatively, the sensor module 940 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 940 may further include a control circuit for controlling at least one of the sensors included therein.

The input device 950 may include a touch panel 952, a (digital) pen sensor 954, keys 956, and an ultrasonic input device 958. The touch panel 952 may be one of capacitive, resistive, infrared, microwave type touch panel. The touch panel 952 may include a control circuit. In the case of the capacitive type touch panel, it is possible to detect physical contact or approximation. The touch panel 952 may further include a tactile layer. In this case, the touch panel 952 may provide the user with haptic reaction.

The (digital) pen sensor 954 may be implemented with a sheet with the same or similar way as touch input of the user or a separate recognition sheet. The keys 956 may include physical buttons, optical key, and keypad. The ultrasonic input device 958 is a device capable of checking data by detecting sound wave through a microphone 988 and may be implemented for wireless recognition. According to an embodiment, the electronic device 901 may receive the user input made by means of an external device (e.g., computer or server) connected through the communication module 920.

The display 960 (e.g., display module 150) may include a panel 962, a hologram device 964, and a projector 966. The panel 962 may be a Liquid Crystal Display (LCD) panel or an Active Matrix Organic Light Emitting Diodes (AMO-LED) panel. The panel 962 may be implemented so as to be flexible, transparent, and/or wearable. The panel 962 may be implemented as a module integrated with the touch panel 952. The hologram device 964 may present 3-dimentional image in the air using interference of light. The projector 966 may project an image to a screen. The screen may be placed inside or outside the electronic device. According to an embodiment, the display 960 may include a control circuit for controlling the panel 962, the hologram device 964, and the projector 966.

The interface 970 may include a High-Definition Multimedia Interface (HDMI) 972, a Universal Serial Bus (USB) 974, an optical interface 976, and a D-subminiature (D-sub) 978. The interface 970 may include the communication interface 160 as shown in FIG. 1. Additionally or alternatively, the interface 970 may include a Mobile High-definition Link (MHL) interface, a SD/MMC card interface, and infrared Data Association (irDA) standard interface.

The audio module 980 may convert sound to electric signal and vice versa. At least a part of the audio module 980 may be included in the input/output interface 140 as shown in FIG. 1. The audio module 980 may process the audio information input or output through a speaker 982, a receiver 984, a earphone 986, and a microphone 988.

The camera module 991 is a device capable of taking still and motion pictures and, according to an embodiment, includes at least one image sensor (e.g., front and rear sensors), a lens (not shown), and Image Signal Processor (ISP) (not shown), and a flash (e.g., LED or xenon lamp) (not shown).

The power management module 995 may manage the power of the electronic device 901. Although not shown, the power management module 995 may include a Power Management Integrated Circuit (PMIC), a charger IC, a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 996, charging voltage, current, and temperature. The battery 996 may store or generate power and supply the stored or generated power to the electronic device 901. The battery 996 may include a rechargeable battery or a solar battery.

The indicator 997 may display operation status of the electronic device 901 or a part of the electronic device, booting status, messaging status, and charging status. The motor 998 may converts the electronic signal to mechanical vibration. Although not shown, the electronic device 901 may include a processing unit (e.g., GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to the various embodiments of the present disclosure, means, but is not limited to, a unit of one of software, hardware, and firmware or any combination thereof The term "module" may be used interchangeably with the terms "unit," "logic," "logical block," "component," or "circuit." The term "module" may denote a smallest unit of component or a part thereof The term "module" may be the smallest unit of performing at least one function or a part thereof A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

According to various embodiments of the present disclosure, the devices (e.g., modules or their functions) or methods may be implemented by computer program instructions stored in a computer-readable storage medium. In the case that the instructions are executed by at least one processor (e.g., processor 120), the at least one processor may execute the functions corresponding to the instructions. The computer-readable storage medium may be the memory 130. At least a part of the programming module may be implemented (e.g., executed) by the processor 120. At least part of the programming module may include modules, programs, routines, sets of instructions, and processes for executing the at least one function.

The computer-readable storage medium includes magnetic media such as a floppy disk and a magnetic tape, optical media including a Compact Disc (CD) ROM and a DVD ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device may be implemented with one or more software modules for executing the operations of the various embodiments of the present disclosure.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

As described above, an electronic device according to various embodiments of the present disclosure may include: a touch panel; and a controller that identifies information on a location and a width of a damaged area within the touch panel and performs a touch compensation function by determining whether a touch is to be compensated for based on the information.

The controller may include a touch area damage identification module that identifies whether the damaged area exists, and the damaged area may be constituted by one or more continuous damaged touch lines among touch lines constituting a touch area. In this case, the controller may detect a touch when performing the touch compensation function and processes the multi-touch into a single touch when identifying that the touch is a multi-touch generated on opposite sides of the damaged area and exists within a reference distance from the damaged area. The controller may deduce a coordinate of an unrecognized touch point by obtaining a particular point between coordinates of the multi-touch when processing the multi-touch into the single touch.

According to an embodiment, the controller may make a control to change display settings of a screen when determining that a touch is not to be compensated for based on the identified information. The controller may make a control to change the display settings of the screen based on at least one of when it is determined based on the information that the damaged area includes a touch line located on the outermost side of the touch panel and when the width of the damaged area is greater than a threshold value. As the method of changing the display settings, the controller may make a control to display the screen in an undamaged area when determining that the damaged area includes the touch line located on the outermost side of the touch panel. The controller may make a control to divide and display the screen in undamaged areas on opposite sides of the damaged area when determining that the width of the damaged area is greater than a threshold value based on the identified information. When dividing and displaying the screen in the undamaged areas, the controller may move and display the remaining screen, which is not displayed in the undamaged areas, according to a user selection.

According to various embodiments, in a storage medium that stores instructions, the instructions are set to allow at least one processor to perform at least one operation when executed by the at least one processor, and the at least one operation may include: an operation of detecting a damaged area in a touch area; an operation of identifying information on a location and a width of the damaged area; and an operation of performing a touch compensation function when a touch is to be compensated for based on the information.

While the present disclosure has been shown and described with reference to various embodiments thereof, it will be understood by those skilled in the art that various changes in form and details may be made therein without departing from the spirti and scope of the present disclosure as defined by the appended claims and their equivalents.

What is claimed is:

1. A method of controlling an operation of an electronic device, the method comprising:
   determining whether a damaged area exists in a touch panel, the damaged area being an area where a touch input is not detected;
   in response to determining the damaged area exists in the touch panel, identifying information on a location and a width of the damaged area;
   determining whether to activate a touch compensation function based on the location and the width of the damaged area; and
   in response to determining to activate the touch compensation function, activating the touch compensation function,
   wherein the activating the touch compensation function comprises:
      detecting the touch input,
      determining whether the touch input includes a multi-touch including at least two touch inputs generated on opposite sides of the damaged area,
      determining a location of the touch input based on a location of each of touch inputs included in the multi-touch, and
      processing the multi-touch into a single touch based on a distance by which the multi-touch is separated from the damaged area.

2. The method of claim 1, wherein the damaged area comprises at least one damaged touch line of touch lines constituting the touch area.

3. The method of claim 1, wherein the processing of the multi-touch into the single touch comprises:
   deducing a coordinate of an unrecognized touch point by obtaining a particular point between coordinates of the multi-touch.

4. The method of claim 1, further comprising:
   changing display settings of a screen when a touch is not to be compensated for based on the information.

5. The method of claim 4, wherein the changing of the display settings of the screen is performed when one of the damaged area comprises a touch line located on an outermost side of the touch area based on the information or the width of the damaged area is greater than a threshold value.

6. The method of claim 5, wherein the changing of the display settings of the screen comprises:
   displaying the screen having a changed size in an undamaged area when the damaged area comprises the touch line located on the outermost side of the touch area based on the identified information.

7. The method of claim 5, wherein the changing of the display settings of the screen comprises:
   dividing and displaying the screen in undamaged areas on opposite sides of the damaged area based on the width of the damaged area.

8. The method of claim 5, wherein the changing of the display settings of the screen comprises:
   displaying a portion of the screen in an undamaged area based on the width of the damaged area.

9. An electronic device comprising:
   a touch panel; and
   at least one processor configured to:
      determine whether a damaged area exists in a touch panel, the damaged area being an area where a touch input is not detected,
      identify information on a location and a width of the damaged area within the touch panel,
      determine whether to activate a touch compensation function based on the location and the width of the damaged area, and
      in response to determining to activate the touch compensation function, activate the touch compensation function,
   wherein the at least one processor is further configured to:
      detect the touch input,
      determine whether the touch input includes a multi-touch including at least two touch inputs generated on opposite sides of the damaged area,
      determine a location of the touch input based on a location of each of touch inputs included in the multi-touch, and
      process the multi-touch into a single touch based on a distance by which the multi-touch is separated from the damaged area.

10. The electronic device of claim 9, wherein the at least one processor comprises a touch area damage identification module configured to identify whether the damaged area exists.

11. The electronic device of claim 9, wherein the at least one processor is further configured to deduce a coordinate of an unrecognized touch point by obtaining a particular point between coordinates of the multi-touch when processing the multi-touch into the single touch.

12. The electronic device of claim 9, wherein the at least one processor is further configured to change display settings of a screen when a touch is not to be compensated for based on the information.

13. The electronic device of claim 12, wherein the at least one processor is further configured to change the display settings of the screen based on at least one of when it is determined based on the information that the damaged area comprises a touch line located on an outermost side of the screen of the touch panel or when a width of the damaged area is greater than a threshold value.

14. The electronic device of claim 13, wherein the at least one processor is further configured to display the screen in an undamaged area when determining that the damaged area comprises the touch line located on the outermost side of the touch panel based on the information.

15. The electronic device of claim 13, wherein the at least one processor is further configured to display a portion of the screen in undamaged areas on opposite sides of the damaged area when determining that the width of the damaged area is greater than a threshold value based on the identified information.

16. The electronic device of claim 13, wherein the at least one processor is further configured to:
   display a portion of the screen having a same size in undamaged areas, and
   move the screen according to a user's selection to display the portion of the screen in the undamaged area when determining that the width of the damaged area is greater than a threshold value based on the identified information.

17. The electronic device of claim 9, wherein the coordinate is deduced by calculating a mean of a first touch point on a first side of the damaged area and a second touch point on a second side of the damaged area.

18. A non-transitory computer readable recording medium with a program recorded thereon, the program when executed by at least one processor performs a method of controlling an operation of an electronic device, the method comprising:
   determining whether a damaged area exists in a touch panel, the damaged area being an area where a touch input is not detected,
   identifying information on a location and a width of the damaged area,
   determining whether to activate a touch compensation function based on the location and the width of the damaged area, and
   in response to determining to activate the touch compensation function, activating the touch compensation function,
   wherein the activating the touch compensation function comprises:
      detecting the touch input,
      determining whether the touch input includes a multi-touch including at least two touch inputs generated on opposite sides of the damaged area,
      determining a location of the touch input based on a location of each of touch inputs included in the multi-touch, and
      processing the multi-touch into a single touch based on a distance by which the multi-touch is separated from the damaged area.

* * * * *